United States Patent [19]
Szczepanski

[11] 4,456,117
[45] Jun. 26, 1984

[54] CONVEYOR WITH SLOW DOWN SECTION

[75] Inventor: Francis A. Szczepanski, Union Lake, Mich.

[73] Assignee: LaSalle Machine Tool, Inc., Troy, Mich.

[21] Appl. No.: 323,853

[22] Filed: Nov. 23, 1981

[51] Int. Cl.³ .............................................. B65G 47/31
[52] U.S. Cl. .................... 198/461; 104/172 B
[58] Field of Search .............. 104/172 R, 172 B, 249, 104/250; 198/339, 461, 779

[56] References Cited

U.S. PATENT DOCUMENTS

| | | | |
|---|---|---|---|
| 3,197,020 | 7/1965 | Evans et al. | 198/779 X |
| 3,237,755 | 3/1966 | Weihe, Jr. | 198/779 |
| 3,382,965 | 5/1968 | Pierce, Jr. et al. | 198/461 |
| 4,266,482 | 5/1981 | Barber | 104/172 B |
| 4,374,496 | 2/1983 | Hanna | 104/172 B |

Primary Examiner—Robert B. Reeves
Assistant Examiner—David F. Hubbuch
Attorney, Agent, or Firm—Stephenson and Boller

[57] ABSTRACT

A power and free conveyor having a slow down section through which conveyed articles travel at reduced speed. The slow down section comprises an endless auxiliary chain traveling at a speed less than the speed of the main drive chains with stops at selected locations along the auxiliary chain. The stops are pivotally mounted and gravity controlled to assume active positions upon entry into the path of travel of the articles so as to interact with an oncoming article to slow the article to the speed of the auxiliary chain. The pivotal motion of the stops with respect to the auxiliary chain is controlled so that the stops are pivoted to an inactive position and carried by the auxiliary chain during return of the chain.

4 Claims, 6 Drawing Figures

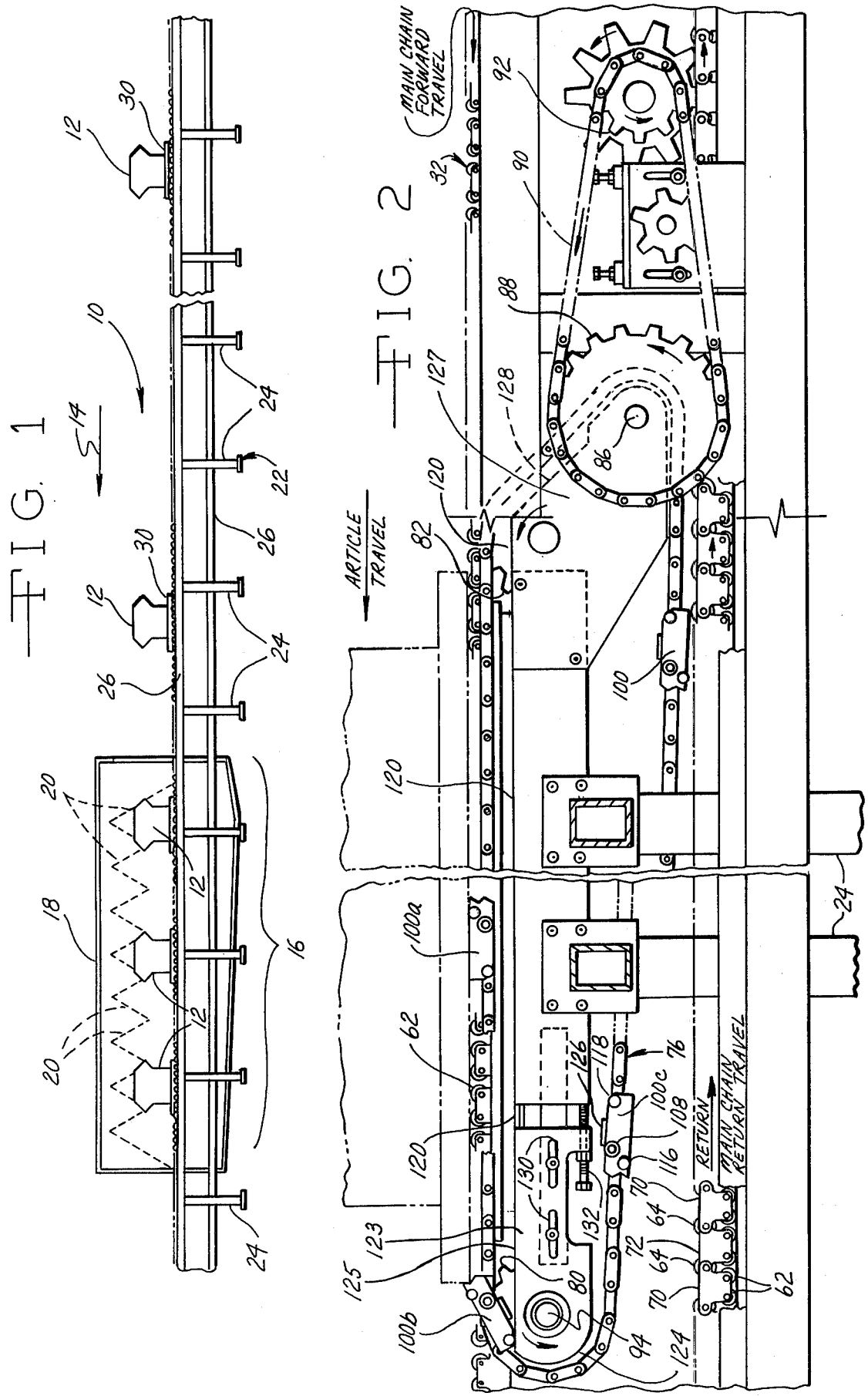

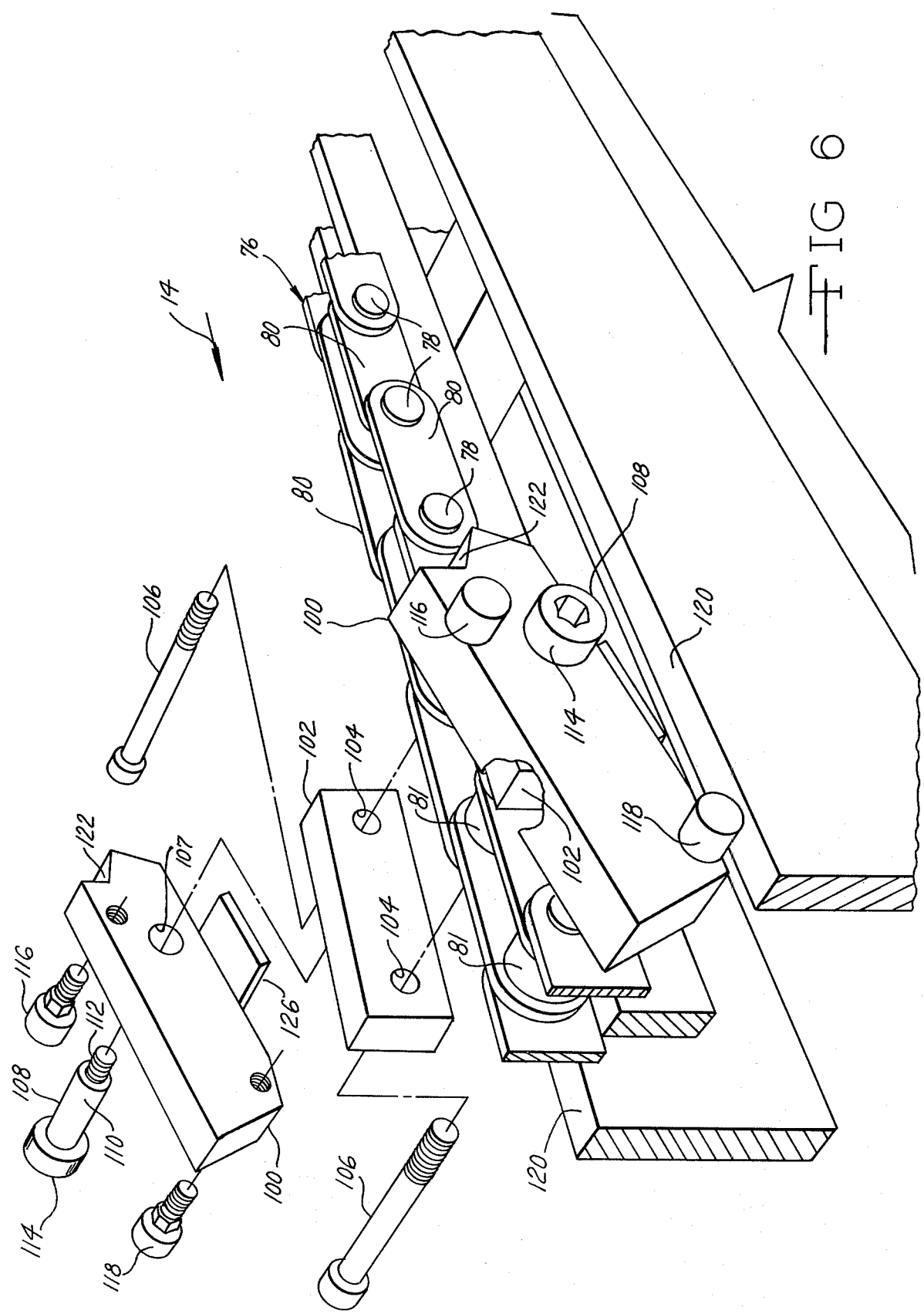

CONVEYOR WITH SLOW DOWN SECTION

BACKGROUND AND SUMMARY OF THE INVENTION

This invention relates generally to conveyors and is particularly concerned with a new and improved power and free conveyor having a slow down section.

Conveyors are used in a multitude of industrial applications for conveying articles. In many of these applications the articles are conveyed by means of a drive chain which operates at a constant speed. In certain applications, however, it is advantageous for the conveyance speed of the articles to be reduced from the nominal speed along a certain section of the line. One way, obviously, of reducing the speed is to slow down the entire conveyor line. This, however, results in inefficiencies and wastefulness because the entire line is slowed down to accommodate the needs of only a limited section of the line. Moreover, the acceleration and deceleration forces impose increased loading on the conveyor in addition to wasting energy and impairing efficiency.

The present invention is directed to a new and improved conveyor having a slow down section which functions to slow down conveyed articles without the necessity of slowing down the main conveyor drive which conveys the articles at the nominal line speed over other sections of the line. With the present invention, the waste and inefficiencies referred to above are avoided. Furthermore, the slow down section can be operated from the same prime mover drive as the main conveyor drive chain through a use of a suitable drive reduction. The invention is also advantageous in that apart from the drive, there are no further electric components, nor are there any pneumatic or hydraulic components required for the slow down section.

The slow down section comprises an endless auxiliary chain which travels forwardly coextensive with a portion of the main drive chain but at a reduced speed from the main drive chain. Stops mounted on the auxiliary chain are operable to active positions to stop articles relative to the auxiliary chain so that the articles are decelerated from the speed imparted to them by the main drive chain to the lesser speed of the auxiliary chain. In the preferred embodiment, the stops are pivotally mounted in imbalance on the auxiliary chain and during their forward motion are biased by force of gravity to their active positions where they can engage the articles by abutment. Each stop further includes a roller which rides on a rail which runs alongside the auxiliary chain, thereby defining the active position for each stop. At the forward turn-around of the auxiliary chain, the imbalance of each stop is such that the stop would tend to pivot in relation to the auxiliary chain. However, as the stop traverses the forward turn-around, the roller continues to engage a circularly contoured arcuate continuation of the rail which is concentric with the circular arcuate path of travel of the chain at the turn-around. This serves to position the stop in relation to the auxiliary chain as it traverses the turn-around so that as the turn-around is completed the returning chain picks up the stop to support it in an inactive position during return travel to the rear turn-around. As the inactive stop traverses to the rear turn-around, it reaches a point where gravity becomes effective to pivot the stop to the active position in anticipation of its imminent entry into the path of travel of the articles.

The stops are furthermore arranged on the auxiliary chain such that if there is an article which overlies an individual stop when that stop begins to enter the path of travel of the articles, then the presence of such an overlying article is effective to return the stop to the inactive position. For this purpose a further roller is provided on each stop which, as the stop begins to enter the path of travel of the articles, is adapted to abut an overlying article. If the overlying article is being conveyed forwardly at the speed of the main drive chain, then the roller rolls, minimizing the frictional impact which would otherwise occur and hence, allowing the article to continue in its travel at the speed of the main drive chain. If the overlying article had already been slowed down by a preceding stop, then there would be no relative movement between a new stop and the article; however, the article is effective to return the new stop to the inactive position.

The foregoing features, advantages, and benefits of the invention, along with additional ones, will be seen in the ensuing description and chains which should be considered in conjunction with the accompanying drawings.

The drawings disclose a preferred embodiment of the invention according to the best mode contemplated at the present time for carrying out the invention.

BRIEF DESCRIPTION OF THE DRAWINGS

FIG. 1 is a fragmentary side elevational view of a conveyor including slow down section embodying principles of the present invention.

FIG. 2 is an enlarged side elevational view, portions being broken away, of the conveyor of FIG. 1, and is taken substantially in the direction of arrows 2—2 in FIG. 3.

FIG. 6 is an exploded fragmentary perspective view of a portion of the slow down section of the conveyor shown in the preceding drawing figures.

DESCRIPTION OF THE PREFERRED EMBODIMENT

Figure 3:
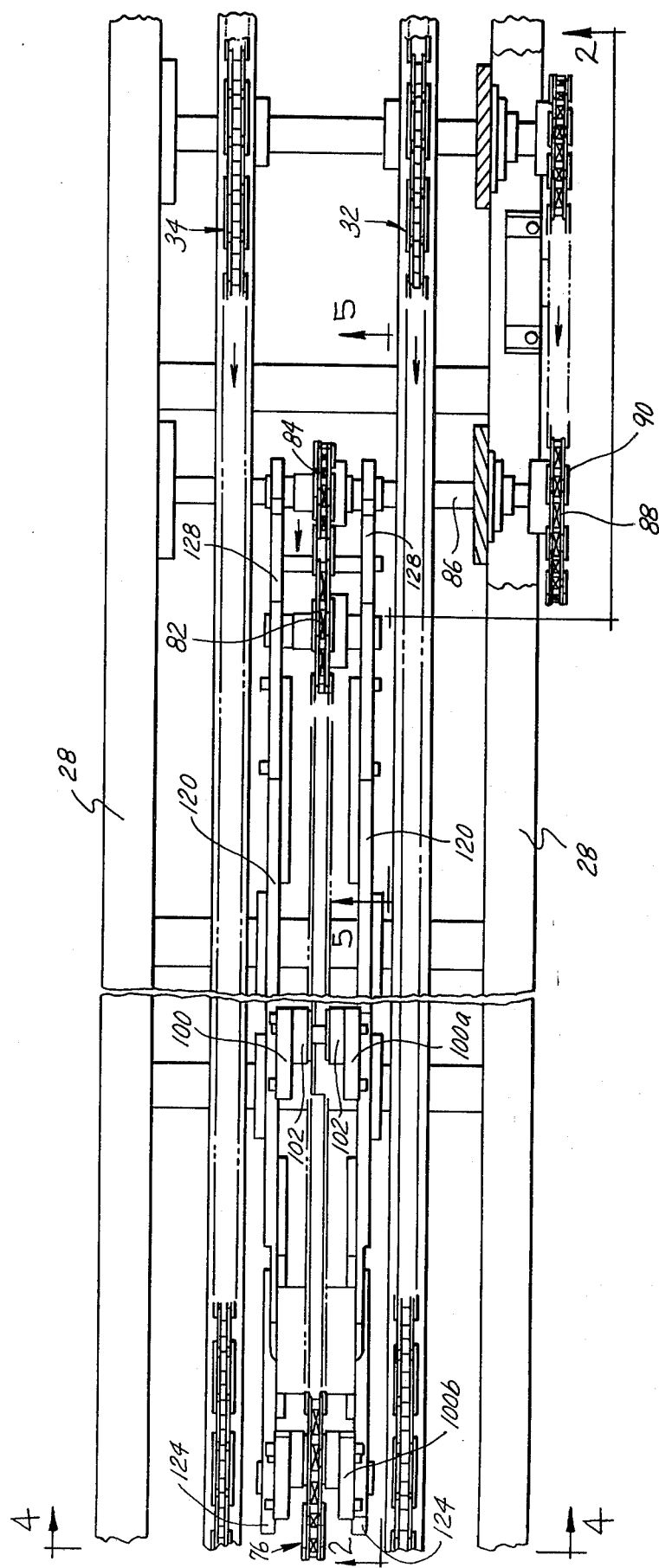
FIG. 3 is a top plan view, having portions broken away, of FIG. 2.

FIG. 1 shows a conveyor 10 embodying principles of the present invention conveying articles 12 along a conveyance path. The articles 12 are being conveyed forwardly in the direction indicated by the arrow 14.

The conveyor includes a slow down section 16 in which the speed at which the articles are conveyed is reduced from the nominal speed which occurs over the remaining illustrated portion of the conveyor.

The slow down section 16 is generally coextensive with a station 18 at which the articles 12 are subjected to a particular operation which is advantageously carried out at the reduced speed provided by the slow down section. In the illustrated embodiment the articles, as they pass through the station 18, are subjected to a spraying operation in which a multitude of spraying heads emit sprays 20 which impinge upon the articles. The spraying and flushing of the articles 12 forms a part of the processing of the articles 12 toward their completed state. For example, the spraying and flushing operation could remove contaminates or undesirable materials from the articles. Principles of the invention, however, are useful in any application where slow down is desired.

Conveyor 10 comprises a floor-mounted frame 22 which provides the structural support for the conveyor mechanism and the articles. The frame includes a plurality of vertical legs 24 at spaced locations along the length of the conveyor line and horizontal frame members 26. Supported on top of the upper horizontal frame members 26 are guides 28 (FIG. 4) which serve to guide the articles being conveyed. Specifically the guides confine the conveyed articles laterally so as to keep them centered as they are conveyed along the line.

At this point, it should be noted that the articles 12, during the conveyance on line 10, are in fact supported on pallets 30. The guides 28 actually are for the purpose of guiding the pallets 30 which themselves are dimensioned to fit closely within the lateral space between guides 28 as viewed in FIG. 4. It will be appreciated that while the articles 12 are pallet-mounted in the disclosed preferred embodiment, the use of pallets is not essential to principles of the invention and that the articles themselves and/or the conveyor may be of such a configuration as to allow the articles to be conveyed directly on the conveyor without the use of any intermediate supports such as pallets.

The conveyor is a power and free conveyor having an endless main drive chain. In the disclosed embodiment the main drive chain comprises two individual drive chains 32 and 34 See FIG. 4), and it should be recognized that principles of the invention are not dependent upon the particular number of individual main drive chains and that a single main drive or multiple drive chains may be used in accordance with the invention. The main drive chains 32 and 34 are endless chains which are driven in unison. Furthermore, in the disclosed embodiment the drive chains are essentially identical.

Support for each of the drive chains 32 and 34 on frame 22 is provided by suitable support structure. As perhaps best seen in FIG. 4, the upper portion of each chain 32 and 34, which travels forwardly in the direction of arrow 14, is supported on a corresponding rail 36, 38, which extends along the length of the conveyor parallel with the horizontal frame sections 26. The illustrated construction for each rail comprises an inverted U-shaped channel member 40, 42 respectively. On top of each inverted channel member is a track 44, 46 respectively. The channel members 40 and 42 are in turn supported from the legs 24 via suitable structural members 47, 48 in the case of channel 40, and members 50, 52 in the case of channel 42.

Figure 4:
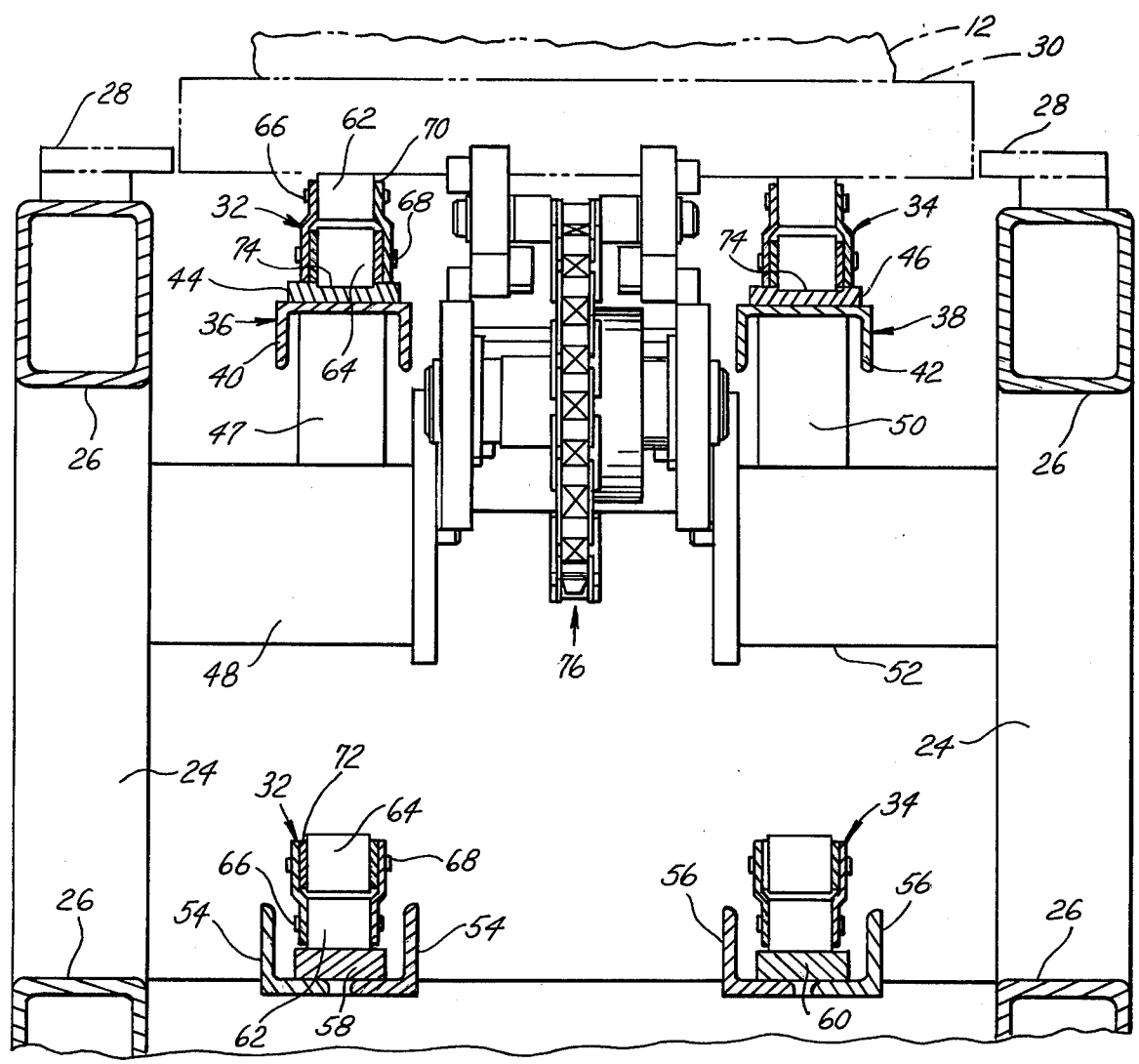
FIG. 4 is an end vertical sectional view, on an enlarged scale, taken in the direction of arrows 4—4 in FIG. 3.
Figure 5:
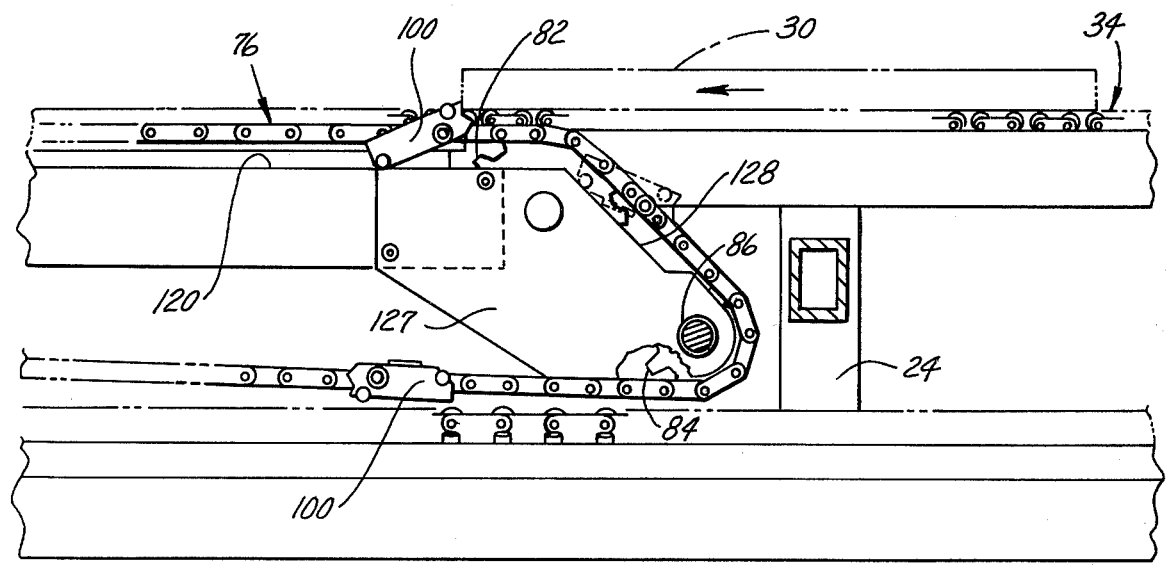
FIG. 5 is a side vertical sectional view, on an enlarged scale, taken in the direction of arrows 5—5 in FIG. 3.

Furthermore, support for the returning portion of each chain 32, 34, namely the lower portions as viewed in FIG. 4, is also provided. In the case of chain 32 the support comprises a pair of angle elements 54 and in the case of chain 34, a pair of angle elements 56. Chain 32 is supported on a rail 58 spanning the angles 54, and chain 34 on a rail 60 spanning angles 56.

The details of each of the main drive chains are essentially identical and hence the details will be described only with reference to the drive chain 32. The drive chain comprises a succession of essentially equally-spaced top rollers 62. The top rollers form an endless row of rollers extending around, and defining the outer perimeter of, the main drive chain. The drive chain further comprises a series of uniformly-spaced lower rollers 64 which are spaced at uniform intervals along the length of the endless chain and which define the inner perimeter of the chain. The outer rollers 62 are supported on the pins 66 while the inner rollers are supported on the pins 68. As best seen perhaps in FIG. 2, the inner and outer rollers and their pins are coupled together by means of links 70 which alternate with links 72. The individual rollers 62, 64 have the same lateral dimension; however, the inner rollers 64 are of a larger diameter than the outer rollers 62.

Tracks 44, 46 include rectangular grooves 74 in which the inner rollers ride and which serve to laterally guide the chains during forward travel. On return, the outer rollers 62 roll on the rails 58 and 60.

As also best seen in FIG. 4, each pallet 30 is supported on the outer rollers 62 of each of the chains 32, 34 during forward travel. The main drive chains 32, 34 may be of an appreciable length, and hence in FIG. 1 the forward and rearward turn-arounds for the chains do not appear. In accordance with the conventional practice each of the chains 32, 34 has a forward and a rear turn-around. Typically these turn-arounds comprise sprocket wheels which engage the corresponding chain whereby as the chain traverses the sprocket wheel it makes a transition in its travel. A suitable prime mover drive (not shown) is connected to drive sprockets so that the sprockets are rotated to in turn impart motion to the drive chains for operating the conveyor to advance the articles forwardly along the conveyor line.

In accordance with principles of the present invention there is provided an auxiliary conveyor chain at the slow down section 16. In the disclosed embodiment, only a single endless chain is utilized for the auxiliary chain and this is identified by the reference numeral 76 in the drawing figures. The illustrated construction for the auxiliary chain comprises a plurality of pins 78, links 80, and spacers 81, connected together in conventional fashion as perhaps best seen in FIG. 6. The auxiliary chain has a forward travel coextensive with a portion of the forward travel of the main conveyor chains 32, 34 along the slow down section 16 and station 18. The main drive chains 32, 34 travel forwardly at a speed which exceeds the forward speed of auxiliary chain 76. Chain 76 is supported on sprocket wheels 80, 82, and 84 mounted on respective shafts suitably journalled on the frame. Sprocket 84 engages the auxiliary chain, and mounts on a drive shaft 86 on which in turn is mounted a sprocket 88 of larger diameter than sprocket 84. The shaft is suitably journalled on the frame. A chain 90 engages sprocket 88, and chain 90 is in turn itself driven from a sprocket 92. Sprocket 92 is driven by the prime mover drive. In this way, the power input from sprocket 92 is transmitted by chain 90, sprocket 88, shaft 86, and sprocket 84 to auxiliary chain 76. By operating sprocket 92 at a constant speed, the auxiliary chain is driven at a constant travel speed through the slow down section at a speed less than the speed at which the main chains 32, and 34 travel forwardly. The same prime mover drive may be used for both main and auxiliary chains.

The sprocket 80 constitutes the forward turn-around for the auxiliary chain. Sprocket 80 is mounted on a shaft 94 which is suitably journalled on the conveyor frame allowing the shaft 94 and wheel 80 to rotate. The forward turn-around provides approximately 180° reversal of the auxiliary chain travel.

The sprockets 82 and 84 may be considered together as constituting the approximate 180° rear turn-around for the auxiliary chain.

In accordance with the principles of the invention, a plurality of stops 100 are carried by auxiliary chain 76. In the illustrated embodiment, the stops are carried in side-by-side pairs at selected locations along the length of the chain although it will be appreciated that principles of the invention contemplate that other arrangements may be provided for mounting of the stops on the chain.

Mounting of the stops 100 on the chain is accomplished at each location by providing mounting blocks 102 laterally on the outside of a set of outer links 80. Suitable holes 104 are provided in one of the blocks 102 at the same spacing as the holes in the links 80. The opposite block 102 has corresponding threaded apertures. Bolts 106 pass through the corresponding holes 104 in the block 102, through the chain and into the tapped holes in the opposite block 102, the pins 78 being omitted. In this way, the blocks 102 are secured to the chain in side-by-side pairs.

The laterally outer side surface of each block 102 is further provided with a tapped hole. Each stop 100 includes a hole 107 which aligns with the tapped hole in the outer side surface of the corresponding mounting block. A pivot bolt 108 passes through the hole 107 in the corresponding stop 100 and into the tapped hole in the outer side surface of the corresponding mounting block 102. For this purpose, it will be observed that the shank of each pivot bolt 108 includes a smooth cylindrical portion 110 and a threaded tip 112. The smooth cylindrical portion 110 provides a pivotal support for the stop about hole 107 while the threaded tip 112 is threaded into the tapped hole in the mounting block 102. The pivot bolt 108 further includes a head 114 which may be tightened by means of a suitable tool to secure the pivot bolt in the mounting block 102. When secured, however, the stop 100 remains freely pivotal on the cylindrical portion 110.

As will be apparent from consideration of FIG. 6, the stops are pivotally supported via pivot bolts 108 in unbalanced conditions. In other words, as should be apparent from FIG. 6, the forward longer portion of each stop tends to swing downwardly, while the rear shorter portion will tend to swing upwardly. The importance of this imbalance will become more apparent from further description later on.

There are further provided on each stop a pair of rollers 116, 118. Each roller 118 is spaced forwardly of the corresponding pivot bolt 108 while each roller 116 is spaced rearwardly. As seen in FIG. 6, the rollers 118, bear against and roll on the top of a corresponding rail 120 during forward travel of chain 76, a rail 120 being provided on each side of the auxiliary chain. Rails 120 are suitably supported on the conveyor frame and are generally coextensive in length with the slow down section and parallel to the forward direction of conveyance. By virtue of the engagement of each roller 118 with the corresponding rail 120 during forward travel of the auxiliary chain, the stops are prevented from pivoting to the positions which they would otherwise occupy with respect to the chain due to their imbalanced mounting on the chain. Accordingly, the abutment of each roller 118 with the corresponding rail 120 serves to define an active position for the corresponding stop during forward travel of the stop through the slow down section and this active position is illustrated in FIG. 6.

In the active position, the stop is pivoted to a point where the rearward portion of the stop projects upwardly into the path of travel of the pallets. Accordingly, in this position each pair of stops is disposed such that the upper rear portions thereof are disposed for abutment by an oncoming pallet containing an article. The illustrated construction for each stop includes a notch 122 adjacent roller 116, which notch is suitable to receive the leading edge of an oncoming pallet as can be seen in FIG. 2.

A forwardly advancing pallet containing an article entering the slow down region will be moving at a velocity which is faster than that of the projecting pair of stops 100 which are immediately in front of the forward edge of the pallet. Hence, as the pallet and article proceed through the slow down region, the forward edge of the pallet abuts the first active pair of stops and the interaction is such that the pallet and the article are stopped in relation to the auxiliary conveyor chain. However, the main conveyor chain continues to travel at the faster speed of the conveyor line and there is a resultant rotation of the outer rollers 62 of the main conveyor chains which are engaging the underside of the pallet 30. Hence, while the power for conveying the articles and pallets forwardly continues to be derived from the main conveyor chains 32, 34, the auxiliary conveyor chain is effective to reduce the speed of the pallets and articles in transit through the slow down section 16, rollers 62 providing slippage. This means that the articles are slowed down as they pass through the washing and flushing station 18 so that the washing and flushing action is significantly more effective in treating the articles 12.

While each article and pallet will be slowed down during passage through the slow down section, it will be appreciated that the actual location in the slow down section at which a pallet and article are slowed down will be subject to a certain amount of tolerance. This will be a function of the relative velocities of the stops and the articles as well as the relative placement of articles on the main conveyor and the relative spacing between the stops. However, at least one of the pairs of stops will be effective during the operation of the conveyor line to slow down each pallet so that the article is properly treated during passage through station 18.

In the event that a pallet were overlying one pair of stops when they were beginning to enter the conveyance path, then those stops are returned to the inactive prone position by engagement of the rollers 116 with the underside of the pallet. An example of this situation can be seen in FIG. 2, where the stop 100a remains in the inactive position while the immediately preceding stop 100b is in the active position abutted by the pallet. Furthermore, in this situation, there is no relative movement between the rollers of the inactive stops and the pallet. However, in a situation where a pair of stops entered the slow down region when there was an overlying pallet, and where the pallet was travelling forward at the speed of the main chains (meaning that that pallet and article had not as yet abutted the preceding stops), then the rollers 116 of the new, pair of stops, in addition to causing that pair of stops to assume their inactive position, provide a rolling interaction with the pallet until such a time as the pallet motion is slowed down by the preceding active stops.

As can be seen in FIG. 2, an end piece 123 is provided at the forward end of each rail 120. Each piece 123 has a straight segment 125 forming a continuation of the corresponding rail 120. A circular contoured segment 124 in the shape of an arc concentric with the axis of shaft 94 is at the forward end of each piece 123. Because of the unbalanced mounting of each stop on the auxiliary chain, the roller 118 will be biased by gravity against the circular contoured portion 124 as the stop traverses the forward turn-around. This serves to control the relative orientation of the stop in relation to the auxiliary chain such that the stop, rather than swinging uncontrollably in relation to the auxiliary chain, will pivot in a controlled fashion relative to the auxiliary chain so as to return toward the inactive prone position as the stop approaches the final portion of the forward turn-around.

There is further provided on each stop a tab 126 which is perhaps best seen in FIG. 6. The tab 126 is on the underside of each stop during forward travel and the stop projects inwardly below the mounting block 102. It will therefore be recognized that as a stop completes the forward turn-around, it will have been positioned by segment 124 such that the force of gravity will be effective to bias the stop in the clockwise direction as viewed FIG. 2. Accordingly, the stop falls onto the chain with tab 126 abutting block 102, causing the stop to assume the inactive prone position during return travel of the auxiliary chain. This can be seen in FIG. 2 where the stop 100c is supported on the returning chain.

Once the chain reaches the rear turn-around, it will continue to remain in this position as it traverses the turn-around portion which is concentric with sprocket 86. Associated with the rear turn-around is a contoured piece 127 which includes an inwardly offset segment 128 which is located between the two shafts on which the sprocket wheels 82 and 84 are mounted. There are two such pieces 127 on opposite sides of the chain. Each piece includes a straight segment forming a rearward continuation of the corresponding rail 120 and intersecting the offset 128 at an angle. As a stop 100 passes sprocket 84 and reaches the offset 128, the stop is in a position where gravity is effective so that the roller 118 falls into and rides upon the offset 128. Accordingly, the stop assumes the active position and remains in the active position as it approaches the conveyance path.

As explained earlier, if there is no overlying article, the stop remains in the active position upon entry into the conveyance path during its forward travel so as to be available to slow down any oncoming article which may abut the stop. Similarly, if there is an overlying article as the stop swings around the arc of the sprocket wheel 82, abutment of the article by the stop will cause the stop to return to the inactive position.

The particular details of the forward and rear turn-arounds for the auxiliary chain which are shown in the drawing are merely exemplary, and it will be appreciated that other configurations for the turn-arounds are entirely possible. The forward turn-around is a single sprocket wheel. The rear turn-around constitutes the two sprocket wheels 82 and 84. Likewise, the particular details of the rails 120 and the turn-around pieces 123, 127 are merely exemplary. As can be seen in FIG. 2, each forward turn-around piece 123 is supported on the frame through a fore and aft adjustment mechanism consisting of guide pins and slots 130 and adjustment nuts and screws 132. Each piece 127 at the rear turn-around is bolted on the conveyor as a continuation of each rail 120.

In operation, the motion of each stop about its pivot on the chain between active and inactive positions occurs over an arc subtending an acute angle, about 30°

It will therefore be appreciated that the invention provides an improved conveyor with a slow-down section wherein the stops are controlled entirely by gravity during operation of the auxiliary chain without separate pneumatic, hydraulic or electrical controls for actuating the stops. The stops are strictly mechanical in construction and gravity operated. While a preferred embodiment of the invention has been disclosed, it will be appreciated that principles of the invention as set forth in the following claims are applicable to other embodiments.

What is claimed is:

1. A power and free conveyor having an endless main drive chain for conveying articles forwardly along a conveyance path and a slow down section for slowing the conveyance of articles to a lesser speed than that imparted to the articles by the main drive chain without changing the speed of the main drive chain, said slow down section comprising an endless auxiliary chain which travels forwardly coextensive with the main drive along a portion of the conveyance path but at a lesser speed than the main drive chain, said auxiliary chain having forward and rear turn-arounds, one or more stops each pivotally mounted on the auxiliary chain and operable over an arc spanning an acute angle subtending its pivotal mounting relative to the auxiliary chain between an active position wherein, when the stop is traveling forwardly with the auxiliary chain along said portion of the conveyance path, it is disposed to slow an article being conveyed by the main drive chain so that the speed of conveyance of said article is reduced from that of the main drive chain to that of the auxiliary chain and an inactive position which is ineffective to slow articles, each such stop being arranged in a pivotally unbalanced condition on the auxiliary chain so as to be gravity-biased toward the active position during forward travel of the stop along said portion of the conveyance path, means against which each such stop is gravity-biased during forward travel of the stop along said portion of the conveyance path thereby serving to establish the active position of the stop, means effective to return the stop to the inactive position via said arc as the auxiliary chain traverses its forward turn-around and to maintain the stop in the inactive position during return to the rearward turn-around of the auxiliary chain until the stop reaches a point where the pivotal imbalance becomes effective to cause the stop to be displaced over said arc to the active position by force of gravity, each stop having a notch at the rear end thereof for engagement with an article to thereby slow the article, and a roller on the stop adjacent the notch which is adapted to engage an overlying workpiece to prevent the stop from assuming the active position if in fact there is an overlying article on the stop when the stop enters the conveyance path.

2. A conveyor as claimed in claim 1 wherein each stop also includes a roller at the forward end thereof, and wherein said means against which each such stop is gravity-biased during forward travel of the stop comprises a rail extending lengthwise of said portion of the conveyance path, each such forward end roller abutting and rolling on the rail when the stop is in the active position during forward travel thereof along said portion of the conveyance path.

3. A conveyor as claimed in claim 2 wherein the rail includes a circular contoured segment at the forward turn-around of the auxiliary chain which is concentric and coextensive with a circular contoured segment of the auxiliary chain forward turn-around path, each such forward end roller continuing to be gravity-biased against the circular contoured segment of the rail during at least a portion of the forward turn-around of the auxiliary chain.

4. A conveyor as claimed in claim 3 wherein said means to return each stop to the inactive position comprises means on the stop disposed for engagement by the auxiliary chain during completion of the forward turn-around thereof, said last-mentioned means continuing to be engaged by the auxiliary chain so as to maintain the stop in the inactive position until a point is reached on the rear turn-around where gravity is effective to once again bring the stop to the active position.

* * * * *